INVENTOR.
Harrison W. Marshall
BY Pollard and Johnston
ATTORNEYS

Jan. 7, 1958     H. W. MARSHALL     2,819,023
AIR CONDITIONING APPARATUS
Original Filed July 21, 1949
3 Sheets-Sheet 2
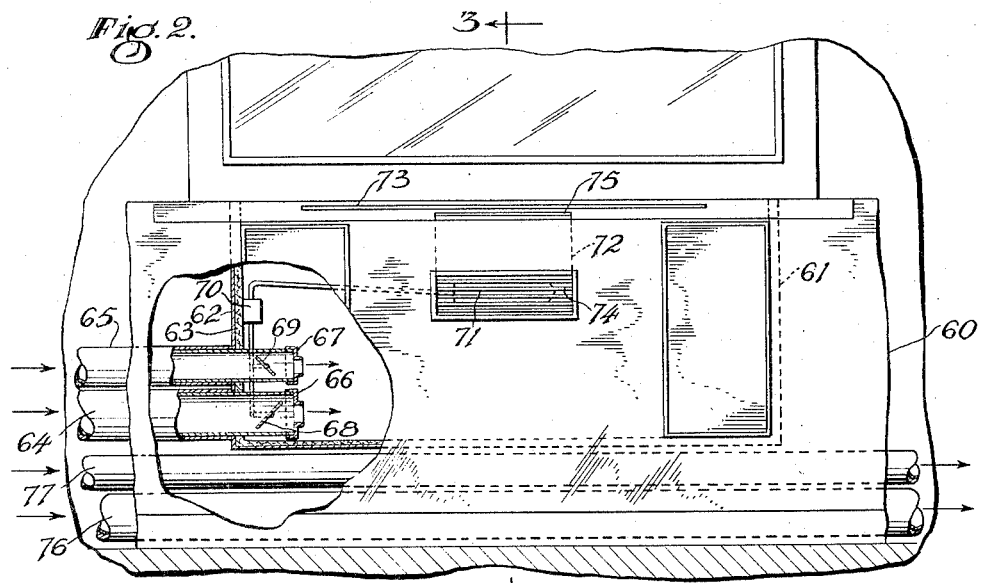
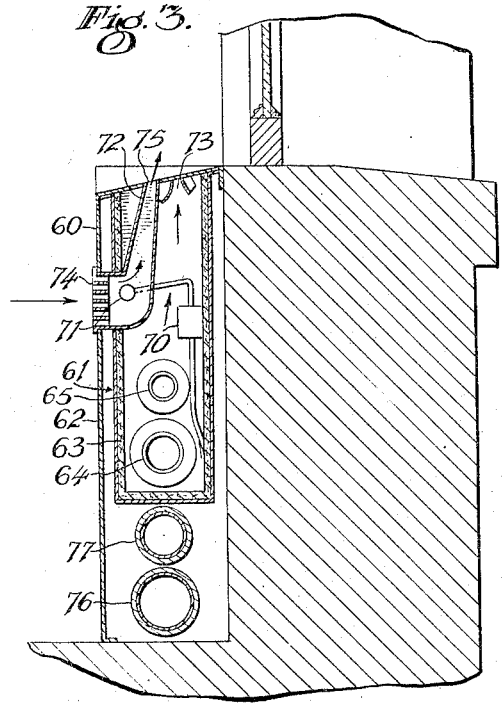
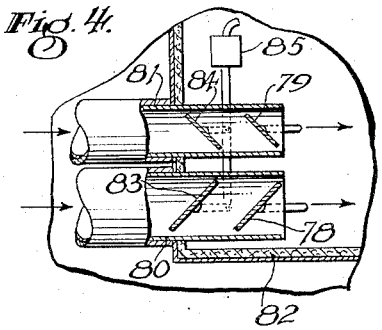
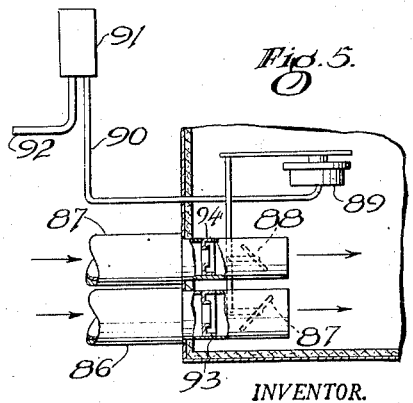
INVENTOR.
Harrison W. Marshall
BY Pollard and Johnston
ATTORNEYS United States Patent Office 2,819,023
Patented Jan. 7, 1958

2,819,023

AIR CONDITIONING APPARATUS

Harrison W. Marshall, Pleasantville, N. Y., assignor to Buensod-Stacey, Incorporated, New York, N. Y., a corporation of Delaware Original application July 21, 1949, Serial No. 106,016. Divided and this application February 27, 1952, Serial No. 273,640

3 Claims. (Cl. 236—13)

This invention relates to an air conditioning system and particularly to a pressure reducing air mixing zone control distributing unit adapted for use in buildings wherein a plurality of zones are to be supplied with conditioned air. This application is a division of copending application S. N. 106,016, filed July 21, 1949, now abandoned.

One of the difficulties in prior practice has been the complicated and expensive duct work and piping required for leading the conditioned air and conditioning elements or agents to the various zones to be conditioned. This especially presents a problem where it is objectionable to have a maze of pipes and ducts along the ceiling and as risers between floors. Where steam, refrigerant, heated and/or cooled water must be fed to the particular zone, many joints and valves must be used which are costly and potential points of leakage. Also, some systems require condensate or other liquid return lines. When coils or grilles are provided at the inlet or outlet points, they must be cleaned and serviced. Further, in many instances, when liquid is supplied to the various units, booster pumps must be employed.

One of the objects of the present invention is to provide an improved air mixing zone control distributing unit for high pressure conditioned air systems.

Another object of the invention is to provide an arrangement for a system wherein individual zones, rooms or spaces can be correctly and accurately conditioned according to desired conditions in each zone thus permitting exterior and interior portions of a building to be conditioned from the same system.

One of the features of the invention is the use of high pressure and velocity air and the provision of a plurality of pressure reducing air mixing zone control distributing units, placed in the various rooms or zones, said zone control distributing units being fed cold and warm conditioned air from central conditioning apparatus. One or more central conditioning apparatus can be employed and placed in suitable locations in the building, said conditioning apparatus furnishing conditioned air, preferably at high pressure and velocity, to cold and warm air ducts leading to the various zone control air distributing units. When low pressure air is used, among other disadvantages, the size of the ducts becomes too great for economical installation and presents difficulty in their location in the building. If the ducts are too big or complicated in arrangement, they tend to spoil the appearance of rooms and even whole areas of the building. As is required in air conditioning systems, at least a minimum amount of outside air is brought into the conditioned air stream at all times of operation for supplying the zones with outside air for ventilating purposes. The temperature of this outside air and condition thereof will influence operation of the conditioning apparatus as to whether heating, cooling, etc., is required. In addition, a further aspect of the invention is the arrangement so that all of the air supplied to the room can be outdoor air.

The cold air duct can be supplied with air at high pressure and velocity by a cold air conditioning apparatus. The warm air duct can be supplied with air at high pressure and velocity by a warm air conditioning apparatus.

When the outside temperature is sufficiently low, the cold air conditioning apparatus can be arranged so that all of the air handled thereby and fed to the distributing unit and made available for the use in the several zones is outside air which will conserve cooling medium and thereby power. In conventional systems for comfort cooling, the normal temperature of the air entering the room is approximately 60° F., whereas in the present invention, the cold air can be made available to the cold air duct at some lower temperature such as approximately 50° F. which reduces the air being handled to approximately two-thirds of the air handled in a conventional system. It is to be understood that this is merely exemplary of one manner in which the system can be used.

In one form of the invention, return air can be used and mixed with the outdoor air, the mixture being conditioned in the cold air conditioning apparatus as desired and then fed to the distributing unit with which this application particularly is concerned.

As mentioned previously, the air in cold and warm air ducts leading to each unit is at high pressure as will be explained hereafter. The air from the hot and cold air ducts at each air mixing zone control distributing unit must be proportioned, mixed, and preferably is progressively reduced in pressure in said distributing unit before it is fed into the room. In order to accomplish this aspect, thermostatic controls for each of the units may be located adjacent the pressure reducing distributing means in the room or zone. This may be in a passage through which air is induced by the flow of air from the distributing unit. The mixed proportioned air can be reduced in pressure progressively in each distributing unit as it is supplied to the room, space, or zone through a nozzle or passage arrangement which completes the reduction of the air pressure as it is introduced into the room.

The air flowing from the pressure reducing distributing means also may be employed to pick up air which might be adjacent the wall or window in the room by aspiration, and thus uniformly condition the entire room. The distributing units can be so placed in the room and zones so as to provide the desired heating or cooling effect therein simultaneously.

The use of high pressure air in the system described herein makes it possible to employ smaller ducts and to proportion the air properly in all zones so that all zones can be maintained at the desired temperature simultaneously. The size of ducts employed leading to the distributing units can have a maximum size in the range of 3" to 6" in diameter. Inasmuch as each of the units is separately controlled, difficulties as to variations in the different portions of the building due to varying transmission from sun effect, varying load from people in the room, varying heat sources such as lighting and power loads, etc., can be surmounted with ease so that each zone is maintained at any predetermined and desired temperature within the range desired and capacity installed.

When return air from the zones is arranged to be used, the cold air conditioning unit can have the outside air fed thereto proportioned to the return air by a damper arrangement. This unit may have cooling coils and heating or preheating coils therein together with humidifying apparatus. The return air duct feeding the cold air conditioning unit also may have dampers therein operating in conjunction with the outside air and return air dampers so as to control the exhausting of the unneeded return air. A return air fan can be used to pull air out of the rooms and return the same to said cold air conditioning unit, to a warm air conditioning unit, or to the outdoors. The cold air conditioning unit preferably furnishes cold air to the cold air riser and duct system at high pressure which can be over 2″ of water static pressure as will be discussed hereafter. The return air fan also may direct air to a second fan having heating units in conjunction therewith for heating the air to the proper temperature required for the warm air supply feeding the pressure reducing air distributing units. The distributing units preferably may be adjacent and under windows or may be in the form of suitable ceiling units. Also, more than one unit can be connected with a horizontal duct arrangement.

In a still further aspect of the invention, all of the air circulated may be conditioned outside air, the return air being pulled from the rooms and exhausted or bled to the outdoors, such a system being used in places such as hospitals where returning the air may not be advisable. When this is done, the fan from the conditioning unit may have a duct leading to the cold air duct system and another duct leading through a heater to the warm air duct system.

It is thus seen that the pressure reducing air distributing boxes or units do not require any liquid or refrigerant lines led thereto or drains therefrom. Only the relatively small high pressure cold and warm ducts from which the cold and warm air is proportioned at each unit according to its individual thermostat are required.

One control system that can be used with the invention has various aspects such as an arrangement whereby when the cooling medium is cut-off in the winter time, heating means in the cold air conditioning unit automatically will come under control of the cold air duct thermostat so that no switchover is required in the control arrangement.

The control system in its preferred form has a thermostat in the cold air duct and a thermostat in the warm air duct. Thus, air of predetermined temperature is made available for each duct so that the distributing unit thermostat will automatically proportion the warm and cold air to that required for the particular room. Each zone or unit thus can furnish the desired conditioned air to the room or zone regardless of its location in the building and the varying load requirements of the particular room.

A single or two single cold air fan units can be used as desired. Preferably, two single cold air fans are employed, one or both of which can be operated as needed so that the fans can be run at maximum efficiency. During the heating season, it will only be necessary to run one of the cold air fans because the hot air fan is carrying the major portion of the load.

These and other objects, advantages, and features of the invention will become apparent from the following description and drawings which are to be considered merely exemplary.

Figure 2 is a fragmentary elevation partially in section of one of the pressure reducing distributor units.

Figure 3 is a section taken along the line 3—3 of Figure 2.

Figure 4 is a fragmentary elevation slightly enlarged of a modified form of the outlet control for the apparatus of Figure 2.

Figure 5 is a fragmentary elevation of another type of control system for the ducts entering the pressure reducing distributor of Figure 2.

Figure 1:
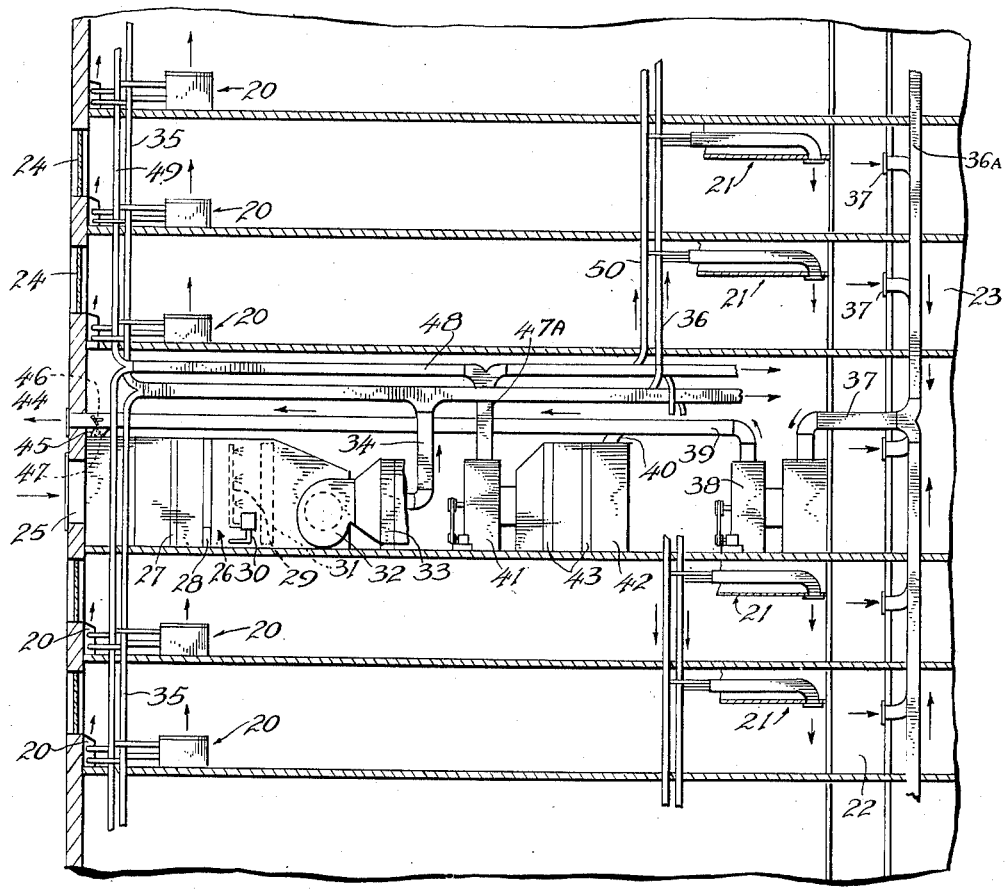
Figure 1 is a fragmentary schematic elevation view of a building employing the units of the invention.

First, a system in which a unit of the present invention can be used will be described wherein return air can be recirculated after passing through the cold air conditioning unit. The pressure reducing air distributing boxes are indicated at 20, located in various rooms and zones. Ceiling units are shown at 21, said ceiling units being used alone or in conjunction with the pressure reducing distributing boxes 20. In the illustrated building, the corridors are shown at 22 and a duct shaft at 23. Windows in the building are seen at 24, window 25 serving as the inlet for the cold air conditioning apparatus 26. Cold air conditioning apparatus 26 may have filters 27, heating or tempering coils 28 and spray units 29, said spray units being furnished with water by pump 30. A water eliminator is at 31 followed by the fan means 32 which may be single or double.

The cooling coils are at 33 at the outlets of the fans in the interest of more efficient operation. The cold air outlet duct 34 leads from the outlet of the fan to risers 35 and 36, said ducts being of sufficient size to carry the required air under high pressure and velocity. For example, ducts 35 may be approximately 5″ in diameter for carrying air at about 4″ static pressure at a velocity of approximately 2500 to 3500 feet per minute.

The return air from the room is collected in riser 36A through corridor inlets 37, said riser or duct 36 connecting through duct 37 with the return air fan 38. The outlet duct 39 from said fan 38 has a connection 40 with the warm air fan 41 through housing 42, said housing containing one or more heating coils 43. Return air fan outlet duct 39 also leads to opening 44 to the outside, serving as a relief duct. The return air duct also is connected at 45 to the inlet air duct for the cold air conditioning apparatus 26, dampers 46 and 47 serving to control the amount of air exhausted to the outside and the amount of air returned to cold air conditioner 26.

Warm air fan 41 has an outlet duct 47A connected to the warm air supply ducts 48, said warm air ducts 48 being in turn connected to warm air risers 49 and 50.

As will be explained hereafter in conjunction with the description of the control apparatus, when the conditioning apparatus is started, the outside air damper arrangement will be opened a predetermined minimum so that some suitable proportion of fresh air always will pass into the system for ventilation purposes. If return air is to be mixed with outside air, dampers 46 and 47 will be moved so as to be in correct position so that the desired amount of return air from return air fan 38 will be fed into cold air conditioner 26. The outside air damper arrangement 25 can be made large enough so that, when desired, all of the air circulated is taken from the outside and no return air used.

In the cold air conditioning apparatus 26, the air is humidified and/or cooled or heated as required to provide the desired temperature of the cold air in the cold air supply duct 34. In normal operation, the temperature of the cold air at 34 can be maintained at 50° F., although this temperature can be above or below 50° F., depending upon the design of the system.

Warm air fan 41 can be operated to draw return air therein and to heat the air to the desired temperature, for example, 120° F. It can, of course, be above or below this temperature. Both fans raise the air to the desired static pressure which may be between 2″ and 6″ of water and to provide a velocity of air in the air ducts of between 1500 and 3500 feet per minute. Thus, high pressure cold air is available at each of the pressure reducing distributor boxes in the various zones and warm air also is available therein for mixing therewith.

The pressure reducing air distributing box with which this application particularly is concerned now will be described. Reference may be made to Figures 2 and 3 which show a unit located under a window of the building. The unit may comprise a suitable cover 60 having a pressure enclosure indicated generally at 61. The casing 61 can have and outside cover 62 and sound absorbing material 63 located inside thereof. The cold air supply duct 64 can be connected with one of the casings, said duct being connected with a cold air riser or conduit. As mentioned before, the maximum diameter of these ducts is in the range of 3" to 6" and preferably not over 25 square inches area. The warm air duct 65 normally is not quite as large as the cold air duct being, for example, about 80% of the size of the cold air duct. Each of these ducts may have insulation if desired, although such is not essential.

Located at the ends of these supply ducts are removable and replaceable orifices 66 and 67, respectively, said orifices being chosen so as to provide the proper flow and quantity of air into the pressure reducing box for the location of the unit.

Dampers 68 and 69 in the cold air and warm air supply ducts respectively are interconnected so as to be operated by a damper motor 70, said damper motor being under control of thermostatic bulb 71, said bulb being located in passageway 72 within casing 61. The thermostatic bulb operates damper motor 70 so as to control the amount of cold and warm air entering the pressure reducing box so that the ratio is that required for the purposes of maintaining the desired temperature in the zone of the distributing unit.

When the unit thermostat calls for the cold air duct to be completely shut off, arrangements can be made so as to provide the minimum air required for ventilation such as by cutting a hole in the damper or by cutting away a segment of the periphery. The air required for ventilation is furnshed through the cold air duct because of the minimum setting of the outside air dampers feeding air to the cold air conditioning means. The second pressure reducing nozzle or slot 73 directs the air from the air distributing box into the room and serves to further reduce the air pressure so that the pressure is thus progressively reduced in the box. The box also serves to mix the air before it is discharged into the room. The velocity of the air passing through slot 73 will induce a flow of air through passage 72 from the room, said air passing through grill 74, over thermostatic bulb 71, and out of the exit nozzle 75 of the thermostatic bulb passageway. Thus, the ambient temperature will operate to proportion the cold and warm air entering the room to provide the desired temperature.

Merely by way of example, the pressure reducing operation can be such that air with a velocity up to 3500 feet per minute in the main conduit and a static pressure of 4 inches of water, can be reduced as it enters the distributing box to about .25 inch of water and then further reduced to pressure as it enters the room through the pressure reducing slot 73. The air will be at the correct temperature as it enters the room to properly condition the room and also will be directed into the room so as to cause air to flow over the thermostat properly and thereby accurately control the proportions of cold and hot air admitted.

When the air distributing box is located under a window, the air adjacent the window will be picked up by the incoming air and thus properly mixed. As is well known, a glass window has poor insulating properties so that the air adjacent thereto may be either quite cold or quite hot depending on outside temperature.

Normally, there are units at various places along the outside wall or under windows so that pipes must be extended from the vertical risers to the remote units. As an example of such an arrangement, cold air duct 76 and warm air duct 77 can be led through the bottom part of cover 60 to the next unit. It is desirable to arrange the ducts in this manner in order to keep the cross sectional area of each duct less than the maximum size permissible before fire dampers are required. Such size is in the range of 25 square inches.

Alternatively, in place of orifices 66 and 67 (Fig. 2), dampers 78 and 79 (Fig. 4) can be located adjacent the ends of the cold and warm air inlet pipes 80 and 81 into unit 82, dampers 83 and 84 being connected to damper motor 85 in a manner similar to that described for Figure 7.

Damper motors 70 (Figs. 2, 3), and 85 (Fig. 4) may be conventional motors controlled by the expansion of a fluid in thermostatic bulb 71.

As a further example, it is possible to locate a thermostat in the room and control the damper motor through fluid control pressure, such as air. This is illustrated in Figure 5 wherein cold air duct 86 has a damper 87 therein and warm air duct 87 has a damper 88 therein, said dampers 87 and 88 being interconnected and operable by a conventional diaphragm damper motor 89. Damper motor 89 is connected by pipe 90 with thermostatic control relay 91, said control relay having control air or fluid furnished thereto through pipe 92.

In the embodiment illustrated in Figure 5, orifices 93 and 94 are shown inserted in the supply pipes ahead of the dampers for volume and reducing pressure controlling air coming into the pressure reducing box.

Figure 6:
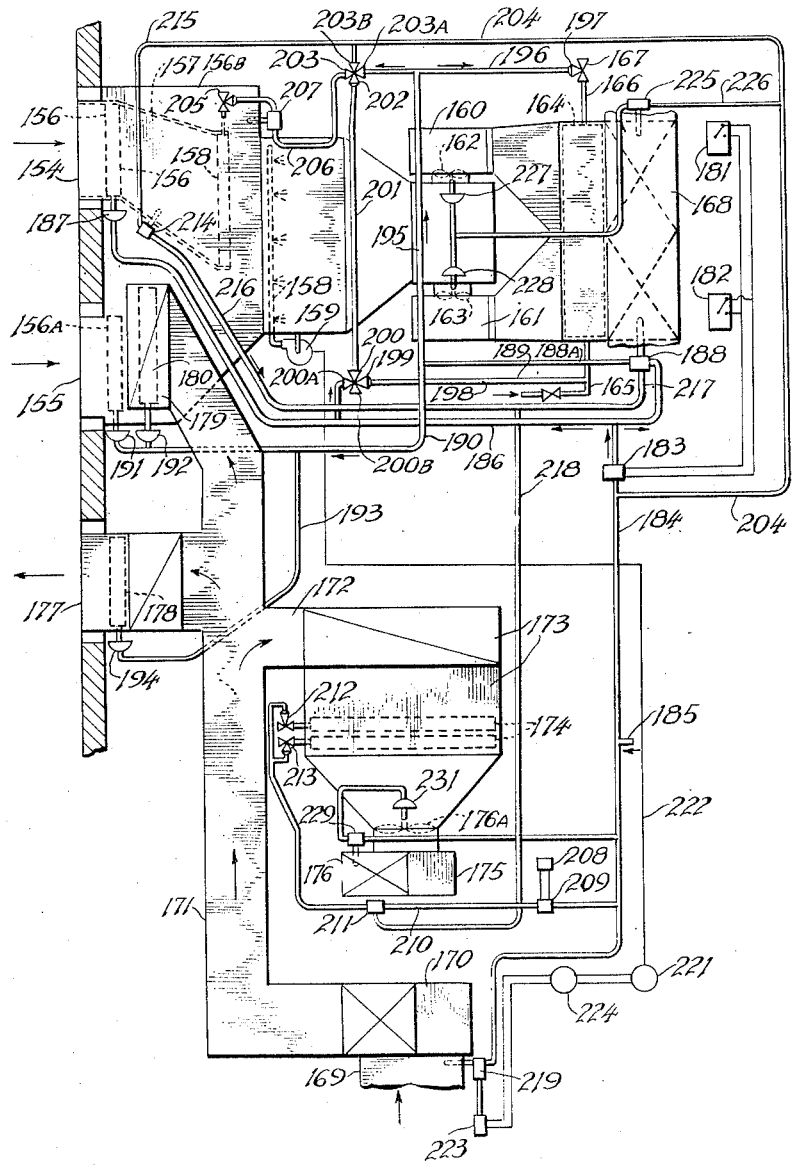
Figure 6 is a schematic control circuit arrangement suitable for use with a system such as that illustrated in Figure 1.

As an example of one manner in which the system of Figure 1 can be controlled, reference may be made to Figure 6 wherein outside air inlets 154 and 155 are connected to the cold air conditioning casing 156B. Inlet 154 is connected thereto through duct 157, there being a preheater or tempering coil 158 in said duct. Conventional dampers 156 and 156A are located in said outside air inlets. Spray means 158 is connected to spray pump 159, said spray pump being connected to a water collecting pan in the casing under the spray elements. Cold air fans 160 and 161 have dampers 162 and 163 in their inlets. A cooling coil 164 of any suitable construction can be employed. In the particular example shown, chilled water is furnished to said coil through pipe 165 and exhausted therefrom through pipe 166 and outlet control valve 167.

The cold air from the cooling coil is led to the cold air ducts 168 corresponding to cold air duct 34 of Figure 1. Return air duct 169 leads to the return air fan 170, said return air fan being connected to duct 171. Duct 171 has a connection 172 with the inlet of the warm air fan casing 173, said casing having a pair of heating coils 174 located therein. The warm air fan 175 may have a damper 176A at the entrance thereof, said fan having an outlet or warm air duct 176 corresponding to duct 47A of Figure 1.

The return air duct 171 also has a connection with the relief air outlet 177 through a damper 178. The return air duct also is connected at 179 with the cold air conditioning casing 156B, there being a suitable damper 180 in said connection.

For purposes of illustration, an air or fluid pressure control system will be described, although, of course, other types of control systems employing other fluids or electrical means may be used. In general, the control system is arranged so that the temperature of the cold air is maintained at a predetermined magnitude as is also the temperature of the warm air. Arrangements can be made so that the various elements and apparatus will be activated in sequence so that when the chilled water or cooling medium is inactivated, because of the availability of sufficiently cold outside air, the preheater in the outside cold air inlet will be placed under control of the cold air duct thermostat. When cooling medium is needed, the preheater thermostat is arranged to function to guard against air which is below a predetermined minimum from entering the system.

Control motor boxes 181 and 182 are provided for starting fans 160 and 161 respectively, said control boxes 181 and 182 being connected electrically with an electropneumatic relay 183, said relay being located in the main control air line 184, said line being supplied with air at 185.

When the relay 183 is activated by operation of one or both cold air fan motors, air is supplied to pipe 186 and to the minimum outside air damper motor 187 to fully open said damper to furnish the required outside air.

Thermostatic relay 188, located in the cold air supply duct 168 also is energized, said thermostatic relay controlling the air pressure in line 188A, said control line 188A being connected to pipe 190 which controls the outside air damper 156A and the return air damper 180 through damper motors 191 and 192 respectively. The dampers 156A and 180 may be arranged so that they properly proportion return air and outside air to maintain the temperature called for by thermostat 188. Control pipe 190 also is connected through pipe 193 to damper motor 194 controlling the relief air damper 178. Thus, outside air damper 156A, return air damper 180 to the cold air conditioner, and relief air damper 178 are operated in conjunction with each other under control of the cold air duct thermostat 188, the thermostat 188 being set, for example, to normally maintain a temperature of approximately 50° F. in the cold air supply duct 168.

As will be explained hereafter, when chilled water is required during the summer cooling season, chilled water valve 167 will be controlled by thermostat 188 through pipe connections 195 and 196 and diaphragm motor valve 197. When thermostat 188 calls for more cooling, valve 167 will be operated to permit more cooling medium to pass through cooling coil 164. The preheater valve motor 205 under this condition will be under control only of the minimum temperature thermostat 207.

Valve 200 may be arranged so that port 200A is normally open and port 200B is normally closed when the cooling medium is cut-off and no pressure is exerted by the cooling medium on valve motor 199 through pipe 198. Control air pressure from pipe 186 then is connected through valve port 200A and pipe 201 to valve motor 202 of valve 203 and will cause valve 203 to be operated, so that the preheater valve motor 205 is connected to the cold air duct thermostat 188 through minimum thermostat 207 in a manner about to be described.

When pressure is exerted on valve motor 202 because the cooling medium is turned off, normally open port 203B of valve 203 will be closed and normally closed port 203A will be opened so that cold air duct thermostat 188 controls the preheater coil 158, through pipes 188A and 195, valve port 203A, valve 203, pipe 206, low limit thermostat 207, and valve motor 205.

Cooling fluid pressure exerted on pressure line 198, due to the presence of cooling fluid, will close normally open port 200A and open normally closed port 200B so as to vent the pipe 201 which will permit normally open port 203B of valve 203 to remain open and normally closed port 203A to remain closed. With port 203B in normally open position, main control air pressure from pipe 204 will reach preheater valve motor 205 through pipe 205 and the preheater thermostat 207. Preheater thermostat 207 is located in the incoming air duct and operates to interrupt control air to said valve 205 when a predetermined minimum temperature is reached, thus permitting valve motor 205 to open the steam valve and feed steam to preheater 158. As an example, thermostat 207 may be set to operate when the temperature in the fresh air duct reaches a minimum of 45° F., thus preventing air which is too cold entering the unit. Thermostat 188 will control the cooling medium valve 167 through pipes 188A, 195, 196 and valve motor 197. It is thus seen that when the chilled water is on, thermostat 188 controls operation of the cooling coil so as to maintain a predetermined minimum temperature and minimum temperature thermostat 207 alone controls the preheater 158.

Thermostat 188 also controls the amount of outside air being taken into the cold air conditioner over and above the minimum outside air being supplied, and the proportionate amount of return air entering the cold air conditioner.

During intermediate seasons, thermostat 188 will serve to proportion the outside air to the return air and this in turn is directly related to the air which must be relieved from the return air system.

When warm air fan 175 is started by operating starting switch 208, electro-pneumatic relay 209 is opened or operated to connect the main control air through pipe 210 to warm air thermostat 211, said thermostat being responsive to the temperature of the air leaving the warm air fan. Thermostat 211 controls heater elements 174 through valves 212 and 213, two heater units being employed so as to obtain the desired temperatures with the greatest efficiency and accuracy.

Cold air thermostat 188 and warm air thermostat 211 are reset by the outside air thermostat 214, said outside air thermostat being located in the minimum outside air duct 157, said thermostat receiving control air through pipes 204 and 215. The air controlled thereby is connected by pipes 216 and 217 to thermostat 188 and by pipe 218 to thermostat 211. As the outside air temperature falls, the thermostats are reset so that a higher temperature is maintained in the warm air duct and in the cold air duct than otherwise normal. The reset thermostat also may be connected with the zone thermostats to increase their setting as the outside air temperature decreases.

Return air fan 170 may be started by a suitable starting box switch (not shown). In return air duct 169, a humidostat relay arrangement 219 can be located, said humidostat being connected to the control air through pipe 220. Spray pump 159 is controlled by switch 221, line 222 diagrammatically indicating the electrical connection between the spray pump and switch 221.

When humidostat 219 calls for more moisture, relay 223 causes switch 221 to start spray pump 159. In the event it is extremely cold, three-way switch 224 can be provided for hand controlling or shutting off operation of the spray pump during the extremely cold period, too much moisture in a room being liable to result in condensation on the windows which is undesirable.

When the combination of a warm air fan and a cold air fan is provided, it is desirable to control the static pressure and this can be accomplished in the cold air fan conditioning means by static pressure regulator 225, said regulator receiving control air from main control air line 204 and pipe 226. Inlet dampers 162 and 163 for fans 160 and 161 are controlled by damper motors 227 and 228 respectively. The static pressure in the warm air duct can be controlled by means of static pressure regulator 229 which is connected to the control air by pipe 230 so as to effectuate control of damper 176 by damper motor 231.

It can be seen that the static pressure in the cold air duct and in the warm air duct are both maintained at a predetermined high pressure regardless of the demands for air by the various units and zones. The outlet temperature of the cold air duct also is maintained substantially constant as is the temperature of air in the warm air outlet.

When the chilled water is turned off, the heating element in the cold air conditioning means automatically is placed under control of the thermostat in the cold air conditioner outlet. The various dampers automatically proportion outside air to return air in accordance with temperature demands. The individual zones are controlled by the zone or pressure reducing box air distributing thermostat to provide the desired temperature air at the various zones. It is apparent that the cold air unit can be employed to furnish all of the air required for circulation and that this can be taken from the outside.

It is to be understood that variations may be made in the various details of construction and arrangement without departing from the spirit of the invention except as defined in the appended claims.

What is claimed is:

1. In a high pressure air conditioning system, a pressure reducing air distributing box comprising an enclosure constructed and arranged to receive air at high pressure and reducing the pressure thereof before discharge into the zone, a high pressure cold air conduit connection to said box and a high pressure warm air conduit connection to said box, damper means in each of said conduits controlling admission of warm and cold air at high pressure into said box, damper motor means within said enclosure connected to said damper means, temperature control means within the confines of said box automatically controlling the proportions of warm and cold air admitted into said box in accordance with the ambient zone temperature, air being reduced in pressure as it enters the box, and restricted outlet slot means in said box directing mixed air therefrom into a zone and further reducing the static pressure, a duct in said box having an inlet open to the zone and an outlet adjacent said outlet slot means and directly open to said zone, said temperature control means including a temperature responsive element located in said duct so that as air is delivered to the zone through said slot means and passes out through its outlet, air at zone temperature will be induced to flow over said temperature responsive element by the air passing through said outlet slot means.

2. In a high pressure air conditioning system, a pressure reducing air distributing box comprising an enclosure constructed and arranged to receive air at high pressure and reducing the pressure thereof before discharge into the zone, a high pressure cold air conduit connection to said box and a high pressure warm air conduit connection to said box, damper means in each of said conduits controlling admission of warm and cold air at high pressure into said box, temperature control means within the confines of said box responsive to zone air temperature and automatically controlling the proportions of warm and cold air admitted into said box in accordance with the ambient zone temperature, said air being reduced in pressure as it enters the box, and restricted outlet slot means in said box directing mixed air therefrom into the zone and further reducing the static pressure, and individual manually adjustable means adjacent said box in each of said conduits and independent of said damper means for controlling the maximum amount of air suppliable to said box through said conduits.

3. In a high pressure air conditioning system, a pressure reducing air distributing box comprising an enclosure constructed and arranged to receive air at high pressure and reducing the pressure thereof before discharge into the zone, a high pressure cold air conduit connection to said box and a high pressure warm air conduit connection to said box, damper means in each of said conduit connections controlling admission of warm and cold air at high pressure into said box, temperature control means within the confines of said box responsive to zone air temperature and automatically controlling the proportions of warm and cold air admitted into said box in accordance with the ambient zone temperature, said air being reduced in pressure as it enters the box, restricted outlet slot means in said box directing mixed air therefrom into the zone and further reducing the static pressure, and selectable orifice means in each of said conduits limiting the maximum amount of air suppliable to the box through each of said conduits to provide the proper flow into the pressure reducing box in accordance with the location of the box with respect to the high pressure system.

References Cited in the file of this patent
UNITED STATES PATENTS

| | | |
|---|---|---|
| 699,352 | Titus | May 6, 1902 |
| 1,954,903 | Walker | Apr. 17, 1934 |
| 2,123,440 | Schlafman | July 12, 1938 |
| 2,225,956 | Haines | Dec. 24, 1940 |
| 2,241,108 | Akers | May 6, 1941 |
| 2,255,735 | McGrath | Sept. 9, 1941 |
| 2,284,764 | Parks | June 2, 1942 |
| 2,609,183 | Fitzgerald | Sept. 2, 1952 |